(12) United States Patent
Vivek Mudhenahalli Rajanna et al.

(10) Patent No.: US 12,212,565 B2
(45) Date of Patent: Jan. 28, 2025

(54) USER IMPERSONATION SYSTEM

(71) Applicant: Sequoia Benefits and Insurance Services, LLC, San Mateo, CA (US)

(72) Inventors: Fnu Vivek Mudhenahalli Rajanna, Foster City, CA (US); Vishwa Bhat Nandikur, Bangalore (IN); Indrajeet Kumar, Bangalore (IN)

(73) Assignee: Sequoia Benefits and Insurance Services, LLC, San Mateo, CA (US)

( * ) Notice: Subject to any disclaimer, the term of this patent is extended or adjusted under 35 U.S.C. 154(b) by 406 days.

(21) Appl. No.: 17/384,054

(22) Filed: Jul. 23, 2021

(65) Prior Publication Data

US 2022/0385657 A1 Dec. 1, 2022

(30) Foreign Application Priority Data

May 31, 2021 (IN) .............................. 202141024182

(51) Int. Cl.
*H04L 9/40* (2022.01)
(52) U.S. Cl.
CPC ................................ *H04L 63/0876* (2013.01)
(58) Field of Classification Search
CPC ............... H04L 2463/082; H04L 63/08; H04L 63/0807; H04L 63/102
See application file for complete search history.

(56) References Cited

U.S. PATENT DOCUMENTS

| | | | | |
|---|---|---|---|---|
| 8,677,446 B2* | 3/2014 | De Peuter | ............. | H04L 63/102 726/21 |
| 9,401,904 B1* | 7/2016 | Hankins | ................... | H04L 63/08 |
| 11,171,958 B1* | 11/2021 | Davey | ................. | H04L 12/1822 |
| 11,399,091 B1* | 7/2022 | Coles | ................ | G06Q 20/40145 |
| 11,553,352 B2* | 1/2023 | Frederick | .............. | H04W 12/66 |
| 11,700,121 B2* | 7/2023 | Harris | ................... | H04L 9/0819 713/185 |
| 2003/0225827 A1* | 12/2003 | Andersen | .................. | H04L 9/40 709/203 |
| 2009/0028049 A1* | 1/2009 | Boudreau | ............. | H04L 63/102 370/235 |
| 2015/0195268 A1* | 7/2015 | Fang | ..................... | H04L 9/3213 726/9 |
| 2016/0036822 A1* | 2/2016 | Kim | .................... | G06F 21/6236 726/4 |
| 2017/0118222 A1* | 4/2017 | Subramanya | ....... | H04L 63/0807 |
| 2018/0288186 A1* | 10/2018 | Kato | ..................... | H04L 63/102 |
| 2019/0007409 A1* | 1/2019 | Totale | ..................... | G06F 21/33 |
| 2022/0005039 A1* | 1/2022 | Hires | ................. | G06Q 20/4014 |

* cited by examiner

*Primary Examiner* — Ali S Abyaneh
(74) *Attorney, Agent, or Firm* — Lowenstein Sandler LLP

(57) ABSTRACT

A first user of a first account associated with a service platform is authenticated based on one or more credentials. Whether the first account of the authenticated first user is authorized to operate in an impersonation mode that enables the first account to impersonate a second account's access to the service platform is determined. Subsequent to authorizing the first account to operate in the impersonation mode a subset of function calls to be called by the first account when impersonating the second account is identified among a plurality of function calls that are permitted to be called by the second account. Information identifying the subset of function calls to be called by the first account when impersonating the second account is providing to a client device associated with the first account.

18 Claims, 5 Drawing Sheets

USER IMPERSONATION SYSTEM

RELATED APPLICATION

This application claims the benefit under 35 U.S.C 119 of Indian Provisional Application No. 202141024182, filed May 31, 2021, which is incorporated by reference herein in its entirety.

TECHNICAL FIELD

Aspects and embodiments of the disclosure relate to computer networking, and more specifically, to operating a platform in an impersonation mode that enables a first account of a platform to impersonate a second account's access to the platform.

BACKGROUND

User impersonation allows a user, such as administrator, to access an account of another user. There are many reasons to impersonate a user such as to troubleshoot an issue, to apply changes, or to preview another user's in-application experience.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure is a method for enabling operation in an impersonation mode that enables a first account of service platform to impersonate a second account's access to a service platform. The method comprising: authenticating a first user of a first account associated with a service platform based on one or more credentials; determining whether the first account of the authenticated first user is authorized to operate in an impersonation mode that enables the first account to impersonate a second account's access to the service platform; subsequent to authorizing the first account to operate in the impersonation mode, identifying, among a plurality of function calls that are permitted to be called by the second account, a subset of function calls to be called by the first account when impersonating the second account; and providing, to a client device associated with the first account, information identifying the subset of function calls to be called by the first account when impersonating the second account.

The method further comprising: receiving, from the client device, a first request to authenticate the first user of the first account of the service platform, the first request identifying the one or more credentials; and responsive to authenticating the first user based on the one or more credentials, sending a first token indicative that the first account is authorized to access the service platform.

The method further comprising: receiving a second request to authorize the first account to operate in the impersonation mode that enables the first account to impersonate the second account's access to the service platform; and responsive to authorizing the first account to operate in the impersonation mode, enabling the first account to acquire a second token that at least in part authorizes the first account to impersonate the second account's access to the service platform.

To determine whether the first account is authorized to operate in the impersonation mode, the method comprises: determining that the first account is authorized to operate in the impersonation mode; determining that the first account associated with a first organization of the service platform is authorized to operate in the impersonation mode for a second organization of the service platform, the second account associated with the second organization; and determining that the first account is authorized to operate in the impersonation mode for the second account associated with the second organization.

To determine whether the first account is authorized to operate in the impersonation mode, the method comprises: determining a plurality of components that are available to the second account of the service platform, the plurality of components accessed by the plurality of function calls; and identifying, among the plurality of components available to the second account of the service platform, a subset of the plurality of components that are authorized for use by the first account when impersonating the second account, wherein the subset of components accessed by the subset of function calls.

The method wherein the subset of function calls is a first subset of function calls, the method further comprising: receiving, from the first account authorized to operate in the impersonation mode, a third request to access a specific component of the service platform and identifying, among the plurality of function calls that are permitted to be called by the second account, a second subset of function calls to be called by the first account to access the specific component of the service platform. The method, wherein the third request to access the specific component of the service platform identifies a second token that at least in part authorizes the first account to impersonate the second account's access to the service platform.

The method, wherein the plurality of function calls that are permitted to be called by the second account comprise a plurality of application programming interface (API) calls, and wherein the subset of function calls comprise a subset of the plurality of API calls.

The method further comprising: causing a presentation of a first graphical user interface (GUI) having an appearance and functionality that are substantially similar to an appearance and functionality of a second graphical user interface associated with the second account's access to the service platform based at least in part on the subset of function calls.

A further aspect of the disclosure is a method for operating in an impersonation mode that enables a first account of service platform to impersonate a second account's access to a service platform. A method comprising: sending, by a client device, a first request to authenticate a first user of a first account associated with a service platform based on one or more credentials; sending a second request to authorize the first account of the authenticated first user to operate in an impersonation mode that enables the first account to impersonate a second account's access to the service platform; and receiving, by the client device associated with the first account that is authorized to operate in the impersonation mode, identifiers of a subset of function calls to be called by the first account when impersonating the second account, wherein the subset of function calls are a subset of a plurality of function calls that are permitted to be called by the second account.

The method further comprising: presenting, by the client device associated with the first account, a first graphical user interface having an appearance and functionality that are substantially similar to an appearance and functionality of a second graphical user interface associated with the second account's access to the service platform based at least in part on the subset of function calls. The method, wherein the plurality of function calls that are permitted to be called by the second account comprise a plurality of application programming interface (API) calls, and wherein the subset of function calls comprise a subset of the plurality of API calls.

The method further comprising: receiving a first token indicating that the first account is authorized to access the service platform in response to the first request to authenticate the first user of the first account associated with the service platform; and receiving an indication that the first account is enabled to acquire a second token that at least in part authorizes the first account to impersonate the second account's access to the service platform in response to the second request to authorize the first account to operate in the impersonation mode. The method, wherein the second token is received by the client device in a response to the second request to authorize the first account to operate in the impersonation mode. The method further comprising: responsive to receiving the indication that the first account is enabled to acquire the second token, retrieving the second token from memory of the client device, wherein the second token is persistently stored at the client device.

The method, wherein a plurality of components of the service platform are available to the second account when accessing the service platform, and wherein a subset of the plurality of components are available to the first account when impersonating the second account based on an authorization policy, wherein the subset of components are accessed by the subset of function calls.

The method, wherein the subset of function calls are a first subset of function calls, the method further comprising: sending, by the client device associated with the authorized first account, a third request to access a specific component of the service platform; and receiving, by the client device, identifiers of a second subset of function calls to be called by the first account when impersonating the second account, wherein the second subset of function calls to be called by the first account to access the specific component of the service platform. The method, wherein the third request to access the specific component of the service platform identifies a second token that at least in part authorizes the first account to impersonate the second account's access to the service platform.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
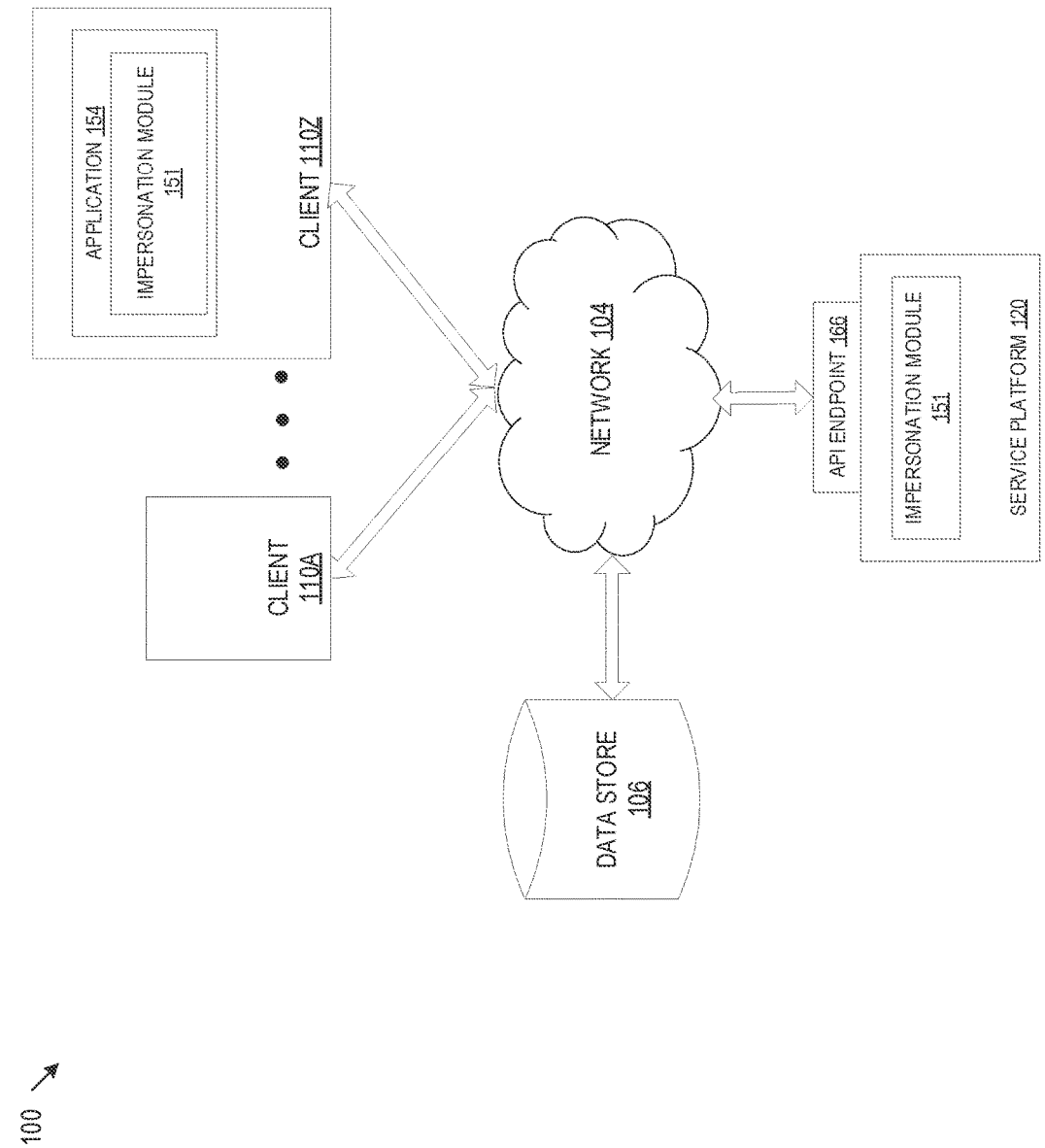
FIG. 1 illustrates an example system architecture, in accordance with some embodiments of the disclosure.

User impersonation can allow a user, such as administrator, to temporarily access a network as a different user. In some cases, user impersonation can further allow the user (e.g., administrator) to see and experience the in-application context of another user account. While impersonating the user the administrator can, for example, perform troubleshooting activities, among others.

Some systems can implement user impersonation features by allowing an administrator to execute for example, an administrator override, which gives the administrator access to a functionality that allows the administrator to impersonate another user. When using an administrator override to impersonate another user, content that is available to the user being impersonated (e.g., impersonated user) is made available to the administrator (e.g., impersonator). However, the presentation of the content to the administrator (and possibly the content itself) may not be the same as a presentation of the content to the impersonated user had the impersonated user been logged into the system and viewed the content. For instance, the administrator may not see the same graphical user interface (GUI) elements, may not see the same organization of GUI elements, or may not see the same content as the impersonated user had the impersonated user been accessing the system. As such, the administrator does not have the same experience (e.g. user experience) using the application as the impersonated user—which presents challenges in troubleshooting, for example. Additionally, impersonating another user can lead to security issues at least because the impersonator can view and potentially change sensitive information (e.g. personal information) related to the impersonated user account. Further, systems implementing impersonation features often expend significant resources (e.g., computer resources, storage resources, network bandwidth, etc.) to make changes to the back-end architecture in order to implement impersonation features.

Some systems can implement user impersonation features by allowing a user, such as an administrator, to login as a different user by using the impersonated user's credentials. Such user impersonation techniques present security issues not only because sensitive information is exposed to the administrator but also because such techniques risk exposing the impersonated user's credentials to malicious actors.

Aspects of the disclosure address the above-mentioned and other challenges by authenticating a user of a first account using one or more credentials. The authenticated user or first user account can further be authorized to access the service platform under the privileges granted to the first account. The authenticated and authorized user account can receive a token, such as an access token that indicates that the user or first account has been authenticated (and authorized) to access the service platform. In some embodiments, the authenticated and authorized first account can subsequently request authorization to operate in an impersonation mode that enables the first account to impersonate a second account's access to the service platform. The request can include the access token associated with the first account.

In some embodiments, the service platform can implement an impersonation authorization policy that indicates whether the first account is authorized to impersonate the second account. If the first account is authorized to impersonate the second account, the first account is enabled to acquire an additional token (e.g., impersonation token) that authorizes the first account to impersonate the second account while the first account is logged into the service platform. In some embodiments, the impersonation token can accompany any subsequent request to access the service platform by the first account operating in impersonation mode.

In some embodiments, the service platform can also implement the impersonation mode such that the service platform has granular control over the components (e.g., functionality or software modules) and/or features of the components (e.g., content or some sub-functionality of the components) that are exposed to the first account operating in impersonation mode, such that from the components and/or feature that are available to the second account (e.g., impersonated account), a subset of the components and/or subset of features of the components are selected and authorized to be exposed to the first user account operating in impersonation mode.

In some embodiments, the service platform can also determine from multiple function calls available to the second account (e.g., impersonated account), a subset of the function calls that correspond to the subset of the authorized components and/or subset of features of the components. The subset of function calls, rather than all the function calls, can be made available to the first account operating in impersonation mode and can be called by the first account to access the functionality of the subset of components or access the subset of features of the components.

For example, as the first user account that is operating in impersonation mode navigates to different parts of the service platform via an application, the first account can request access to one or more different components. The service platform can determine whether the first account operating in impersonation mode is authorized to access a particular component(s) and/or feature(s). If the first account operating in impersonation mode is authorized to access the particular component and or feature (determined using the impersonation authorization policy,), service platform can send a response to the first account that identifies a corresponding subset of function calls that enable the first account to access the functionality of the particular component or feature. As such, the function calls that enable the first account operating in impersonation mode to access the particular component(s) and/or the particular feature(s) of the service platform are continuously identified and continuously made available to the impersonator account at runtime.

In some embodiments, the service platform can cause a presentation of a first graphical user interface (GUI) at the first account operating in impersonation mode to have an appearance (e.g., GUI elements and content) and functionality (e.g., components and/or features) that are substantially similar to an appearance and functionality of a second graphical user interface associated with the second account's access to the service platform.

As noted, a technical problem addressed by embodiments of the disclosure is the security issue of exposing sensitive information of the impersonated user (e.g., personal information, credentials, etc.).

Also noted, another technical problem addressed by embodiments of the disclosure is the large amount of resources (e.g., compute resources, storage resources, network bandwidth, etc.) used to modify back-end systems and infrastructure in order to implement impersonation features.

Also noted, another technical problem addressed by embodiments of the disclosure is that the appearance and functionality of a GUI used to implement impersonation features are not substantially the same as the appearance and functionality of a GUI that would have been presented to the impersonated user had the impersonated user been logged into the system.

A technical solution to the above identified technical problems may include authenticating a first user of a first account associated with a service platform. Whether the first account of the authenticated first user is authorized to operate in an impersonation mode that enables the first account to impersonate a second account's access to the service platform is determined. Subsequent to authorizing the first account to operate in the impersonation mode, a subset of function calls to be called by the first account when impersonating the second account is identified among multiple function calls that are permitted to be called by the second account. Information identifying the subset of function calls to be called by the first account when impersonating the second account is provided to a client device associated with the first account.

Another technical solution to the above identified technical problems includes sending, by a client device, a first request to authenticate a first user of a first account associated with a service platform based on one or more credentials. A second request to authorize the first account of the authenticated first user to operate in an impersonation mode that enables the first account to impersonate a second account's access to the service platform is sent. Identifiers of a subset of function calls to be called by the first account when impersonating the second account are received by the client device associated with the first account that is authorized to operate in the impersonation mode. The subset of function calls are a subset of multiple function calls that are permitted to be called by the second account.

Thus, the technical effect may include improving the security issue of exposing sensitive information of the impersonated user. For example, the service platform can granularly control the components and features of the components that are exposed to the impersonator account by implementing an impersonation authorization policy and/or selecting a subset of function calls that can be called by the impersonator user account. Additionally, the execution of impersonation mode is shared between the service platform and client device such that some elements of impersonation mode are performed by the service platform and other elements of impersonation mode are performed by the client device, which helps prevent a malicious actor from acquiring all the elements to impersonate another user.

Further, the technical effect may include reducing the amount of resources (e.g., compute resources, storage resources, network bandwidth, etc.) that are used in modifying back-end systems and infrastructure to implement impersonation features. Aspects of the disclosure can be used to implement an impersonation mode on an existing system at least in part by implementing an impersonation authorization policy and/or dynamically updating at runtime the function calls that are made available to the impersonator account.

Further technical effects may include causing a presentation of a first GUI associated with the impersonator account where the first GUI has an appearance and functionality that are substantially similar to an appearance and functionality of a second GUI associated with the second account's access to the service platform.

In some embodiments, access to the service platform or accessing the service platform can refer to the authorization of an account to access the service platform and/or generally refer to the access of one or more of services, functionality, and/or content provided by the service platform by, for example, navigating to different parts of an application used to interface with the service platform, selecting (or interfacing) with different GUI elements of the GUI of the application, or selecting (or interfacing, changing, submitting, etc.) content via the GUI.

FIG. 1 illustrates an example system architecture 100, in accordance with some embodiments of the disclosure. The system architecture 100 (also referred to as "system" herein) includes a service platform 120, a data store 106, and client devices 110A-110Z connected to a network 104.

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing content items (such as human resources (HR) content, also referred to as "human resources information" herein) as well as data structures to tag, organize, and index the content items. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by service platform 120 or one or more different machines coupled to the service platform 120 via the network 104.

The client devices 110A-110Z (generally referred to as "client device(s) 110" herein) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 110A through 110Z may also be referred to as "user devices."

In some embodiments, a client device, such as client device 110Z, can implement or include one or more applications, such as application 154 (also referred to as "client application 154" herein) executed at client device 110Z. In some embodiments, application 154 can be used to communicate (e.g., send and receive information, such as content items) with service platform 120. In some embodiments, application 154 can implement user interfaces (e.g., graphical user interfaces (GUIs)) that may be webpages rendered by a web browser and displayed on the client device 110Z in a web browser window. In another implementation, the user interfaces of client application 154 may be included in a stand-alone application downloaded to the client device 110Z and natively running on the client device 110Z (also referred to as a "native application" or "native client application" herein). In some embodiments, client devices 110 can communicate with service platform 120 using one or more function calls, such as application programming interface (API) function calls (also referred to as "API calls" herein). For example, the one or more function calls can be identified in a request using one or more application layer protocols, such a HyperText Transfer Protocol (HTTP) (or HTTP secure (HTTPS)), and that is sent to the service platform 120 from the client device 110Z implementing application 154. The service platform 120 can respond to the request from the client device 110Z by using an application layer protocol.

In some embodiments, a user can request authentication (e.g., log in) of the user (or respective user account, also referred to as "account" herein) using one or more user credentials (also referred to as "credentials" herein), such as user name and password. In some embodiments, two-factor authentication can be used at application 154 for secure authentication of the user or user account. In some embodiments, a user of client device 110Z can configure the application 154 with customized user settings that are stored as user preference data.

In some embodiments, the service platform 120 may include or be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to content items. Such computing devices may be positioned in a single location or may be distributed among many different geographical locations. For example, service platform 120 may include a plurality of computing devices that together may comprise a hosted computing resource, a grid computing resource or any other distributed computing arrangement. In some embodiments, service platform 120 may correspond to an elastic computing resource where the allotted capacity of processing, network, storage, or other computing-related resources may vary over time.

In some embodiments, service platform 120 provides one or more API endpoints 166 that can expose services, functionality or content of the service platform 120 to one or more of client devices 110. In some embodiments, an API endpoint can be one end of a communication channel, where the other end can be another system, such as a client device 110Z. In some embodiments, the API endpoint can include or be accessed using a resource locator, such a universal resource locator (URL), of a server or service. The API endpoint can receive requests from other systems, and in some cases, return a response with information responsive to the request. In some embodiments, HTTP or HTTPS methods can be used to communicate to and from API endpoint 166.

In an illustrative example, used for illustration rather than limitation, service platform 120 can include an HR platform that can at least in part provide one or more HR services to one or more organizations. For example, the service platform 120 may allow a user to consume, upload, and search for HR information. Human resources can refer to people (e.g., employees) that make up the workforce of an organization. The service platform 120 may also include a website (e.g., a webpage) or application back-end software that may be used to provide a user with access to content items, such as HR information. In some embodiments, HR information can include information related to human resources. HR information can include, but is not limited to, one or more of compensation information (e.g., salary or annual salary increases), bonus information (e.g., amount of bonus payments and criterion to qualify for bonus payments), equity information (e.g., amount of grants, value of grants), merit-based reward information (e.g., type of reward, amount of reward, and criterion to quality for reward), health benefit information (information regarding health, vision and dental plans including the contents of the plans, cost of the plans, benefit plans for employees' family, and plan information for enrolled employees, such as claims and claims status), retirement benefit information (e.g., 401k and employee contribution matching), employee training information, tuition reimbursement information, among other information.

In some embodiments, service platform 120 is part of an organization, such as a corporate organization. In some embodiments, service platform 120 can offer one or more services and/or information to one or more organizations. For example, embodiments, the service platform 120 is accessible, at least in part, by one or more users of one or more organizations. In another example, service platform 120 can provide HR services using the service platform 120 to one or more users of one or more organization. In some embodiments, service platform 120 can store and host HR information and provide access to the HR information through client devices 110A-110Z. In some embodiments, service platform 120 and/or client devices 110 include an instance of impersonation module 151. In some embodiments, impersonation module 151 hosted by service platform 120 and/or impersonation module 151 of client device 110Z can perform one or more aspects of the disclosure.

An organization can refer to an entity, such as a legal entity, that includes multiple people and that has a particular purpose. A non-limiting example of an organization includes a corporation (e.g., authorized by law to act as a single entity or legal entity). In some embodiments, multiple organizations can describe one or more organizations that are independent or distinct from the other organizations of the multiple organizations. For example, a first organization can be corporation A and a second organization can be corporation B. Corporation A can be considered an independent legal entity from corporation B. Each of corporation A and corporation B make independent decisions and have a different hierarchical structure.

In some embodiments, service platform 120 can include a multitenant system. Multitenancy can refer to a mode of operation of software where multiple independent instances of one or multiple applications operate in a shared computer environment. In some embodiments, the instances (tenants) can be logically isolated, but physically integrated. The degree of logical isolation can be complete, but the degree of physical integration can vary. The tenants (application instances) can be representations of organizations that obtain access to the multitenant application. The tenants may also be multiple applications competing for shared underlying resources. For example, multiple organizations can access the resources of service platform 120 without any indication that the resources are shared between the multiple organizations. The data of each of organizations can be logically isolated from one another such that each organization has access to their own data but not the data of other organization in the multitenant system.

In some embodiments, a "user" may be represented as a single individual. However, other embodiments of the disclosure encompass a "user" being an entity controlled by a set of users and/or an automated source. For example, a set of individual users federated as one or more departments in organization may be considered a "user." In general, functions described in one embodiment as being performed by the service platform 120 can also be performed on the client devices 110A through 110Z in other embodiments (and vice versa), if appropriate. In addition, the functionality attributed to a particular component can be performed by different or multiple components operating together. The service platform 120 can also be accessed as a service provided to other systems or devices through appropriate application programming interfaces, and thus is not limited to use in websites.

Although embodiments of the disclosure are discussed in terms of service platforms, such a human resource platform, embodiments may also be generally applied to any type of platform, system or service.

In situations in which the systems discussed here collect personal information about users, or may make use of personal information, the users may be provided with an opportunity to control whether the service platform 120 collects user information, or to control whether and/or how to receive content from the service platform 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the service platform 120.

Figure 2:
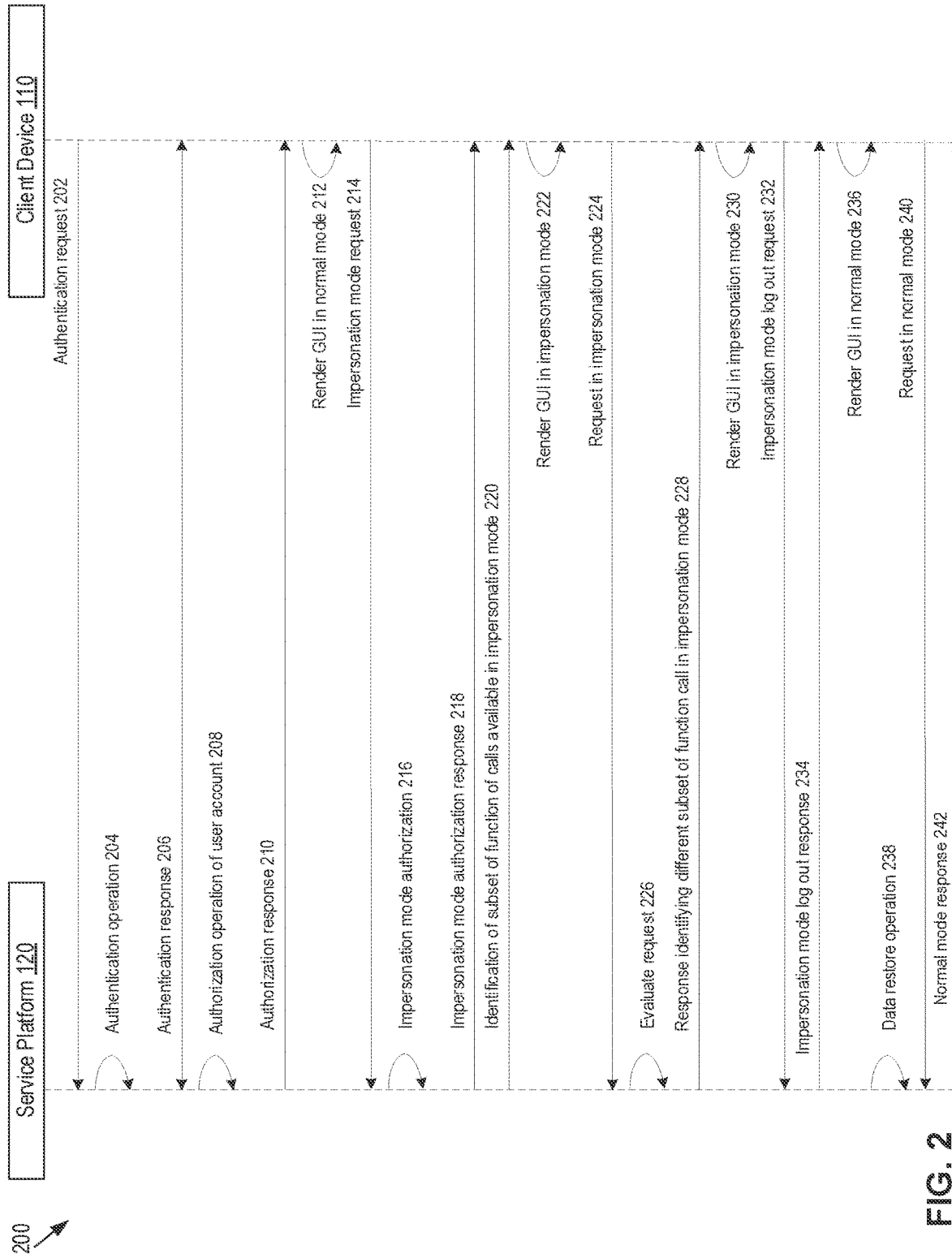
FIG. 2 is a diagram of operations of user impersonation at the service platform, in accordance with embodiments of the disclosure.

FIG. 2 is a diagram of operations of user impersonation at the service platform, in accordance with embodiments of the disclosure. Diagram 200 may include similar elements as illustrated in system 100 as described with respect to FIG. 1. It may be noted that elements of FIG. 1 may be used herein to help describe FIG. 2. Diagram 200 illustrates service platform 120 and client device 110Z (also referred to as "client device 110" herein), and operations performed at the client device 110Z and service platform 120 and communication between the client device 110Z and service platform 120. In some embodiments, service platform 120 and client device 110Z may implement the impersonation module 151 to perform some or all the operations. The operations described with respect to FIG. 2 are shown to be performed serially for the sake of illustration, rather than limitation. It may be noted that in some embodiments the operations may be performed in any order or may be performed one or more times. In some embodiments, some operations may be omitted or may include the same or additional operations.

In some embodiments, one or more of the requests made by the client device 110, as described herein, to the service platform 120 can be API requests that are sent to an API endpoint of service platform 120.

At operation 202, client device 110 sends a request to service platform 120 requesting authentication of one or more of the user of client device 110, the account of the user, or the client device 110. In some embodiments, the request can identify (e.g., include) one or more user credentials, including but not limited to one or more of username or password. As noted above, in some embodiments the communication between the client device 110 and service platform 120 can be performed using one or more application layer protocols, such as HTTP or HTTPS.

At operation 204, service platform 120 receives the authentication request and performs one or more authentication operations to authenticate one or more of the user of client device 110, the account of the user, or the client device 110 based on the one or more user credentials. For example, service platform 120 can determine if the username and password identified by the authentication request are similar to (e.g., match) the user name and password combination stored at the service platform 120 for the particular user account. In some embodiments, one or more of the authentication operations can be performed by a third-party service, such as a third-party authentication service.

At operation 206, service platform 120 sends an authentication response to client device 110 in response to the respective authentication request. If the service platform 120 determines that the one or more of the user of client device 110, the account of the user, or the client device 110 is not authenticated, service platform 120 can indicated in the response that client device 110 has not been authenticated for access to the service platform 120. For example, the service platform 120 can request that the user of the client device 110 resubmit one or more user credentials for the respective user account, request that the user of the client device 110 supply additional credentials for the user account, or prohibit the user (or client device 110) from submitting an additional authentication request for at least a period of time.

If the service platform 120 determines that one or more of the user of client device 110, the account of the user, or the client device 110 is authenticated, service platform 120 can enable the client device 110 to acquire a token (e.g., access token) to access the service platform 120 via the respective user account. As noted below, the service platform can also enable the client device 110 to acquire the token after the authentication and authorization. In some embodiments, a token can identify or contain the security credentials for a login session and identify one or more of the user, the user account, the user's associated organization, the user' role, the user's groups, the user's privileges, and, in some cases, a particular application. In some embodiments, the token can include or be associated with a session identifier (ID) of the particular session of the user. In some embodiments, the token can be or include a cookie. A session is a group of user interactions with an application (e.g., website) that take place within a given time frame. For example a single session can contain multiple page views, events, social interactions, or transactions. The session can start when a user account is authenticated and end after a period of inactivity and/or when the user account is logged out.

At operation 208, responsive to authenticating one or more of the user of client device 110, the account of the user, or the client device 110, service platform 120 performs an authorization operation to determine which components (e.g., functionality, software modules, features, and/or services, etc.) and features of the components (e.g., sub-functionality and/or content, such as data, images, etc.) can be accesses on the service platform 120 by the specific user account based on the user account privileges. For example, each user account of a particular organization can have access to different components and/or features. For instance, a user account associated with the HR department may be authorized to access the retirement account component and features that include functionality and information pertaining to the retirement accounts of all participating employees in the organization. A particular employee of the organization that is not part of the HR department may be authorized to access a different retirement account component and different retirement account features that include different functionality and only information pertaining to the particular individual's own retirement account. To determine authorization of the user account, service platform 120 can identify a particular policy (e.g., authorization policy) that identifies which components and features the user account is authorized to access (e.g., in normal mode).

At operation 210, service platform 120 sends to the client device 110 an authorization response. The authorization response can identify one or more of the components and/or features of the service platform 120 that the particular user account is authorized to access. In some embodiments, any of the operations 202, 204, 206, and 208 can be combined or re-ordered. For example, service platform 120 can receive the authentication request (operation 202) and perform the authentication operations (operation 204) responsive to receiving the request. If the service platform 120 determines that the user account (and/or user and/or user device) is authenticated, service platform 120 can perform one or more authorization operations (operation 208). The, service platform 120 can determine the components and/or features that are authorized for access by the user account and send a response to the user account that identifies an access token and that makes one or more authorized components and/or features available to the user account.

At operation 212, client device 110 renders the graphical user interface (GUI) in a normal mode. Normal mode can refer to a mode of operation where the user account accesses the service platform 120 using the components and/or features authorized for the particular user account. For example, a user account accessing the service platform 120 in normal mode can access the health insurance component and the user account's health insurance information. A corresponding GUI can be rendered that presents the user account's health insurance information and provides functionality with respect to the health insurance component.

At operation 214, client device 110 sends a request that requests authorization for the user account to operate in impersonation mode. Impersonation mode enables the user account (e.g., impersonator) to impersonate another account's (e.g., impersonated) access to the service platform 120. In impersonation mode, a user account (e.g. impersonator) can access the service platform 120 as if the user account were logged in as another user account (e.g., impersonated). For example, user Abel can be logged into Abel's user account and be operating in normal mode. Abel via Abel's user account can request authorization to operate in impersonation mode to impersonate Betty's access to the service platform 120. In impersonation mode, Abel can access at least some of the same components and/or features that Betty could access (e.g., functionality) had she been logged into her user account. In impersonation mode, the components and/or features would further be presented to Abel via a GUI in a manner that would be substantially similar to what would be presented to Betty had she been logged into her user account.

In some embodiments, the authorization request to operate in impersonation mode is an authorization request to impersonate a specific user account associated with another user (e.g., rather than any user account). In some embodiments, the impersonated user account and the impersonator user account can be associated with the same organization, a different organization, a same department in the same organization, a different department in the same organization, or different organizations, for example.

A department can refer to a group within an organization that contributes to an organization's mission or goals. Departments of an organization can be based on the function the department serves within the organization. For example, departments of an organization can include, but are not limited to, research and development (R&D), Marketing, Legal, Human Resources, Accounting, among others. Each of the various departments can include one or more employees that perform the functions of the respective department.

In some embodiments, the authorization request to operate in impersonation mode identifies or includes one or more of the token (e.g., access token), the session ID, the organization ID associated with the user account (impersonator user account), user ID of the user (impersonated) for which impersonation mode is requested (e.g., email address), or account ID of the account (impersonated) for which impersonation mode is requested.

In some embodiments, the GUI rendered at the client device 110 (operation 212) may include one or more GUIs elements that allow the user account (e.g., impersonator account) to request authorization to operate in impersonation mode. In some embodiments, the one or more GUI elements can also allow the user account to identify another user account to impersonate.

At operation 216, service platform 120 receives the authorization request to operate in impersonation mode and performs one or more authorization operations related to the authorization request. In performing the one or more authorization operation, service platform 120 can implement an impersonation authorization policy that identifies the impersonation authorization privileges of the user account to operating in impersonation mode. In some embodiments, the impersonation authorization policy can identify whether the requesting user account can operate in impersonation mode. In some embodiments, the impersonation authorization policy can identify one or more of the organizations, departments, user accounts that the requesting user account is authorized to impersonate. In some embodiments, the impersonation authorization policy can identify the components and/or features associated with one or more of organizations, departments and user accounts that the requesting user account is authorized to access in impersonation mode. In some embodiments, the impersonation authorization policy can identify the function calls that the requesting user account is authorized to use in impersonation mode. In some embodiments, the impersonation authorization policy can be established and/or modified by an administrator of the organization associated with one or more of the impersonated user account or impersonator user account. In performing the one or more authorization operations, service platform 120 determines whether the user account is authorized to operation in impersonation mode based on the impersonation authorization policy. In some embodiments, the one or more impersonation mode authorization operations, as describe below, can be performed based on the impersonation authorization policy.

In some embodiments, the authorization policy can also be established and/or modified by the impersonated user account. For example, an impersonated user may desire that some personal information is not exposed to an impersonator user account when the impersonator user account is operating in impersonation mode. The impersonated user account may send a request to service platform 120 that identifies one or more particular modules and/or features (e.g., such as personal information) that are not to be made available to the impersonator user account operating in impersonation mode. In some embodiments, the request can also identify one or more specific user accounts for which the one or more particular modules and/or features (e.g., such as personal information) are not to be made available when the specific user accounts are operating in impersonation mode. In some embodiments, the request can identify that any user accounts are not to access one or more particular modules and/or features when operating in impersonation mode. In response to the request, service platform 120 can establish and/or modify the authorization policy in accordance with the request. The established and/or modified authorization policy can further be implemented as described herein.

In some embodiments, to perform one or more impersonation mode authorization operations, service platform 120 can determine whether the first account has authorization to operate in impersonation mode. If the user account does not have authorization to operate in impersonation mode, the impersonation mode authorization request is prohibited and a response denying the impersonation mode authorization request is sent to the client device 110. If the user account has authorization to operate in impersonation mode, the service platform 120 can either grant authorization to operate in impersonation mode or perform one or more other impersonation mode authorization operations described herein.

In some embodiments, to perform one or more impersonation mode authorization operations, service platform 120 can determine whether the first account that is associated with a first organization has authorization to operate in impersonation mode for a second organization of the service platform 120. The second organization can be associated with the impersonated user account. In some embodiments, the first organization and the second organization are different organizations. In some embodiments, the first organization and the second organization are the same organization. If the user account does not have authorization to operate in impersonation mode, the impersonation mode authorization request is prohibited and a response denying the impersonation mode authorization request is sent to the client device 110. If the user account has authorization to operate in impersonation mode, the service platform 120 can either grant authorization to operate in impersonation mode or perform one or more other impersonation mode authorization operations described herein.

In some embodiments, to perform one or more impersonation mode authorization operations, service platform 120 can determine whether the first account has authorization to operate in impersonation mode for the second account associated with the second organization. If the user account does not have authorization to operate in impersonation mode, the impersonation mode authorization request is prohibited and a response denying the impersonation mode authorization request is sent to the client device 110. If the user account has authorization to operate in impersonation mode, the service platform 120 can either grant authorization to operate in impersonation mode or perform one or more other impersonation mode authorization operations described herein.

In some embodiments, to perform one or more impersonation mode authorization operations, service platform 120 can determine the components and/or features (e.g., features of the components) that are available to the impersonated user account based on the user account privileges. The functionality and features of the components can be accessed by function calls. As noted above, each user account can have particular user account privileges that identify the components and features that are available to a particular user account. In some embodiments, service platform 120 can determine that the impersonator user account is authorized to operate in impersonation mode to access the service platform 120 using a subset of the components and/or subset of the features that are available to the impersonated account based on the impersonation authorization policy. The subset of components and subset of features can be accessed by a subset of the function calls. In some embodiments, service platform 120 can determine that the impersonator user account is authorized to operate in impersonation mode using all of the components (but a portion of the features), some of the components (but all of the features of the some components), or some combination of components and/or features that are available to the impersonated account. If the user account does not have authorization to operate in impersonation mode (e.g., does not have authorization for any of the components or features available to the impersonated user account), the impersonation mode authorization request is prohibited and a response denying the impersonation mode authorization request is sent to the client device 110. If the user account has authorization to operate in impersonation mode, the service platform 120 can either grant authorization to operate in impersonation mode or perform one or more other impersonation mode authorization operations described herein. It can be noted that in some embodiments, determining the components and/or features of the impersonated user account that the impersonator user account is authorized to access can be performed outside of impersonation mode authorization operations. For example, service platform 120 can determine the components and/or features of the impersonated user account that the impersonator user account is authorized to access after the impersonator user account has been authorized to operate in impersonation mode, as further described below.

In an illustrative example, the impersonated user account may be permitted (via user account privileges) to access a company information component, a health insurance component, a retirement benefit component, a purchasing component, and the corresponding features of each component. In impersonation mode, the impersonator user account may be authorized to access the company information component associated with the impersonated user account, the health insurance component associated with the impersonated user account, the retirement benefit component associated with the impersonated user account, and the corresponding features but is not authorized to access the purchasing component and corresponding features. In another illustrative example, the impersonator user account can include more granular authorization where, for example, the impersonator user account has authorization to access only a component available to the impersonated user account, but not all the associated features. For instance, the impersonator user account can be authorized to access the health insurance component (e.g., can view and navigate the GUI associated with the health insurance component), but is not authorized to access some features of the health insurance component (e.g., cannot view or access the personal health data of the user of the impersonated account).

At operation 218, service platform 120 sends an impersonation mode authorization response to client device 110 responsive to receiving the impersonation mode authorization request at operation 216. As noted above, if the user account does not have authorization to operate in impersonation mode, service platform 120 sends a response to client device 110 denying the impersonation mode authorization request. If the impersonation mode authorization request is authorized, the service platform 120 sends a response enabling the impersonator user account to impersonate the impersonated user account. In some embodiments, the impersonation mode authorization response enables the impersonator user account to acquire a token (also referred to as an "impersonation token" or "impersonation access token" herein) that at least in part authorizes the first account to impersonate the second account's access to the service platform. In some embodiments, the impersonation token can identify one or more of the impersonator user account, the impersonated user account, and indicate that the impersonator user account is operating in impersonation mode to impersonate another user account. In some embodiments, the impersonation token is a different token than the access token. In some embodiments, the impersonation mode authorization response can include the impersonation token. In some embodiments, the impersonation mode authorization response can identify the impersonation token that is stored local to the client device 110. The client device 110 can retrieve the correct impersonation token that is locally stored based on the impersonation mode authorization response.

In some embodiments, the authorization response can include or identify additional information related to impersonation mode. The additional information can include one or more of an indication that impersonation mode is active (e.g., permitting a flag at the client device to be set that indicates impersonation mode is active), an ID of the impersonated user's role (e.g., engineer, HR employee, etc.) in the organization, the user ID of the impersonated user, organization ID associated with the impersonated user, user account ID associated with the impersonated user, the organization ID of the impersonating user, the account ID associated with the impersonating user, among others. One or more of the additional information can be stored at the client device 110 in, for example, a cookie.

In some embodiments, the authorization response (and/or the response in operation 220) can include or identify information (e.g., instructions) to render or present the GUI at the client device 110 in impersonation mode such that the GUI at client device 110 is presented as if the impersonated user account were accessing the service platform 120. The authorization response can include or identify information identifying the GUI elements (e.g., component such as a title row) and the content to be rendered (e.g., the information or data in the title row) such that the appearance of the GUI is substantially similar to an appearance of GUI that would have been presented to the impersonated user had the impersonated user account accessed the service platform 120. In some embodiments, the authorization can include the appropriate markup language that identifies the GUI elements and content to be rendered. In some embodiments, server-driven user interface techniques can be implemented to identify the GUI elements and content to be rendered at the client device 110.

In some embodiments, impersonation mode can be authorized or performed without authorization by the user of the impersonated user account. In some embodiments, the impersonated user account can be impersonated by the impersonator user account without the one or more user credentials of the impersonated account. In some embodiments, impersonation mode can be authorized or performed without an administrator override. In some embodiments, impersonation mode can be performed by the impersonator user account while the impersonator user account is logged in under the user's credentials and/or using the session ID obtained in normal mode. In some embodiments, the session of the user account operating in impersonation mode is different from a session associated with the second user account (e.g. the impersonator user account operating in impersonation mode is different session that the user account of the impersonated user account is logged in). In some embodiments, impersonation mode can be performed by the impersonator user account when the impersonator user account is not logged in (or irrespective of whether the impersonator user account is logged in).

At operation 220, service platform 120 can send to the client device 110 a response with identifiers of a subset of the function calls permitted to be called by the impersonator user account when impersonating the second user account. As noted above, the subset of function calls correspond to a subset of components and/or subset of features that are authorized for the impersonator user account when impersonating the impersonated user account. In some embodiments, identifiers of the subset of function calls can be sent along with the authorization response as described with respect to operation 218. In other embodiments, the subset of function calls can be sent separately from the authorization response as described with respect to operation 218. In some embodiments, the function calls include API calls.

In some embodiments, identifiers of the subset of function calls sent in the response can include application code, such as script. The application code can be executed at the client device 110 and used to make a request to access the service platform 120 and/or render the GUI. In some embodiments, identifiers of the subset of function calls can include a numeric identifiers or other identifiers that reference the subset of function calls available to the impersonator user account to access a particular component and/or feature. In some embodiments, the identifiers can be associate with a record (e.g., library, table, etc.) stored at the client device 110. The identifiers can be used to identify the corresponding function calls in the record. The identified function calls can be used by the impersonator user account in making a request to access service platform 120 (e.g., components and/or features). In some embodiments, the identifiers of the subset of function can be inserted in a request to access particular component and/or feature of the service platform 120.

In some embodiments and as noted above, the subset of function calls that are identified to the impersonator user account can change dynamically at runtime. For example, the subset of function calls can change during the parts of the session within which impersonation mode is active. For instance, a first subset of function calls can be related to an access of the service platform 120 using a particular webpage (e.g., particular component). When the impersonator user account accesses a different webpage (or different part of the webpage) a different subset of function calls that are related to the different webpage are authorized and made available to the impersonator user account, as described above at least with respect to operation 218 and 220.

At operation 222, client device 110 renders the GUI of the service platform 120 in impersonation mode. The GUI is rendered such that the presentation of the GUI is substantially similar (e.g., substantially mimics) to a presentation of the GUI at the impersonated user account had the impersonated user logged in to their account and were accessing the same part of the service platform 120.

At operation 224, client device 110 operating in impersonation mode sends a request to service platform 120. In some embodiments, the request can be any request sent to the service platform 120 from the client device 110 when the impersonator user account is operating in impersonation mode. In some embodiments, the request can be a request to access one or more components or features of the service platform 120. For example, the impersonator user account can access a different part of the application, access a different webpage of the website, request information pertaining to the impersonated account, and so forth. In each aforementioned example, client device 110 can send a respective request to the service platform 120. In some embodiments, the request can include or identify the impersonation access token. For example, the impersonation token can be identified in the header of the request. In some embodiments, the request can include or identify one or more of the access token, session ID, an ID of the impersonated user's role in the organization, the user ID of the impersonated user, the organization ID associated with the impersonated user, the user account ID associated with the impersonated user, the organization ID of the impersonating user, and the account ID associated with the impersonating user.

At operation 226, service platform 120 evaluates the request of operation 224. As noted above the request can be for access to a component and/or feature of service platform 120. For example, the user can be accessing an HR component (e.g., HR software module) of the service platform 120 and the request can be for access to a different component, such as a retirement account component (e.g., retirement account module) of the service platform 120. In analyzing the request, service platform 120 can determine whether the requested component is available to the impersonated user account. If the component is available to the impersonated user account, service platform 120 determines whether the impersonator user account is authorized to access at least part of the requested component (e.g. using the impersonation authorization policy). In some embodiments, if the service platform 120 determines that the impersonator account is authorized to access the requested component, service platform 120 further identifies the features of the requested component that are available to the impersonated account. Service platform 120 can determine whether the impersonator user account is authorized to access at least part of the features of the requested component (e.g., using the impersonation authorization policy). In some embodiments, service platform 120 can identify a subset of functions calls that allow access (e.g., enable the functionality of) to the authorized component and features of the component by the impersonator user account (e.g., using the impersonation authorization policy).

In an illustrative example, the impersonator user account in impersonation mode requests access to the retirement account component of the service platform 120. Service platform 120 can determine whether the impersonated user account has access to the retirement account component. If the service platform 120 determines that the impersonated user account does have access to the retirement account component, service platform 120 determines whether the impersonator user account is authorized to access the retirement account component of the impersonated user account.

In the above example, service platform 120 determines that the impersonator user account is authorized to access the retirement account component based on the impersonation authorization policy. Service platform 120 then determines the features of the retirement account component that are available to the impersonated user account. Service platform 120 determines which of the features of the retirement account component that are authorized for access by the impersonator user account based on the impersonation authorization policy. The service platform 120 determines that the impersonator user account is not authorized to access the impersonated user's personal information related to the retirement account component but is authorized to access all other data associated with the retirement account component. The service platform 120 determines functions calls that are permitted to be called by the impersonated user account to access the retirement account component. The service platform then identifies, among the function calls that are permitted to be called by the impersonated user account to access the retirement account, a subset of the function calls that can be called by the impersonator user account when accessing the retirement account component. The subset of function calls can allow the impersonator user account to access the retirement account component and to access the authorized features (but not the unauthorized features) of the retirement account component.

At operation 228, service platform 120 sends a response to client device 110 identifying the subset of function calls that can be called by the impersonator user account when impersonating the impersonated user account. For example, the request can include information that identifies the subset of function calls that allows the impersonator user account to access the retirement account component and the authorized features of the retirement account component. In some embodiments, the identification of the subset of function calls occurs during run-time. For instance, for each request by the client device 110 to access the service platform 120 in impersonation mode, the service platform 120 can determine the appropriate subset of function calls that are authorized to be called by the impersonator user account. The service platform 120 can send to the client device 110 a corresponding response identifying the authorized subset of function calls. As noted above, the responses can also identify the GUI elements and content corresponding to the authorized component and/or feature(s).

At operation 230, client device 110 can render the GUI in view of the response from operation 228. Operation 230 can be similar to operation 222. Elements of operation 222 can apply to operation 230 and are not repeated for the sake of brevity.

At operation 232, client device 110 sends a request to service platform 120 to log out of impersonation mode. In some embodiments, the request can include similar information as described with respect to the request in operation 224. For example, the request can include the impersonation token and/or the access token.

At operation 234, in response to the request from client device 110 to log out of impersonation mode, service platform 120 sends to client device 110 a corresponding response indicating that the user account has logged out of impersonation mode. In some embodiments, the response prohibits the user account from further using the impersonation token. For example, the request can contain information that invalidates the impersonation token. In another example, the request can contain information that resets the impersonator mode flag to false at the client device 110. In another example, the request can direct the impersonator user account to stop accessing the impersonation token and direct the impersonator user account to use the access token for future requests to access the service platform 120.

At operation 236, client device 110 can render the GUI in normal mode such that the respective user account (e.g., formally the impersonator user account) renders the GUI to reflect the GUI elements and content associated with the user account, rather than the GUI elements and content associated with the impersonated account.

At operation 238, service platform 120 can perform a data restore operation to restore any content (e.g., data) that may have been changed (e.g., altered, added, or removed) in the impersonated user account by the impersonator user account when operating in impersonation mode. In some embodiments, the service platform 120 can keep a log of activity that records that access to the service platform 120 by the impersonator user account operating in impersonation mode. To perform the data restore operation, the service platform 120 can use the log to reverse any changes to the content of the impersonated user account made by the impersonator account.

In other embodiments, the impersonator user account operating in impersonation mode is prohibited to making any changes to the content associated with the impersonated user account. For example, the impersonation mode can operate in a read-only sub-mode so that changes to the content associated with the impersonated user account are partially or totally prohibited. In the read-only sub-mode the content associated with the impersonated user account can be viewed, but the ability to change the content is at least partially if not wholly restricted.

At operation 240, client device 110 sends service platform 120 a request to access the service platform 120 in normal mode. The request can identify and/or include the access token. In some embodiments, the access token can be the same access token that was identified in the original authentication of the user account (e.g., operation 204 and 206). In some embodiments, the user account does not re-authenticate after logging out of impersonation mode and can use the original access token and/or the original session ID.

At operation 242, service platform 120 sends a response to the request to access the service to platform in normal mode. For example, the service platform 120 can determine whether the requested component is available to the user account in normal mode. If the component is available, the service platform 120 determines the function calls associated with the component and sends information in the response that identifies the function calls. In some embodiments, the service platform 120 can also send information identifying the corresponding GUI interface, GUI elements and content to render the GUI at client device 110.

Method 300 and 400 and/or each of method 300's and 400's individual functions, routines, subroutines, or operations can be performed by a processing device, having one or more processing units (CPU) and memory devices communicatively coupled to the CPU(s). In some embodiments, method 300 and method 400 can be performed by a single processing thread or alternatively by two or more processing threads, each thread executing one or more individual functions, routines, subroutines, or operations of the method. The method 300 and method 400 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 is performed by impersonation module 151 described in FIG. 1 and FIG. 2, such as impersonation module 151 executed at service platform 120. In some embodiments, method 400 is performed by impersonation module 151 described in FIG. 1 and FIG. 2, such as impersonation module 151 executed at client device 110Z. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. Reference is made to elements of FIG. 1 and FIG. 2 to help illustrate the method 300 of FIG. 3 and method 400 of FIG. 4.

Figure 3:
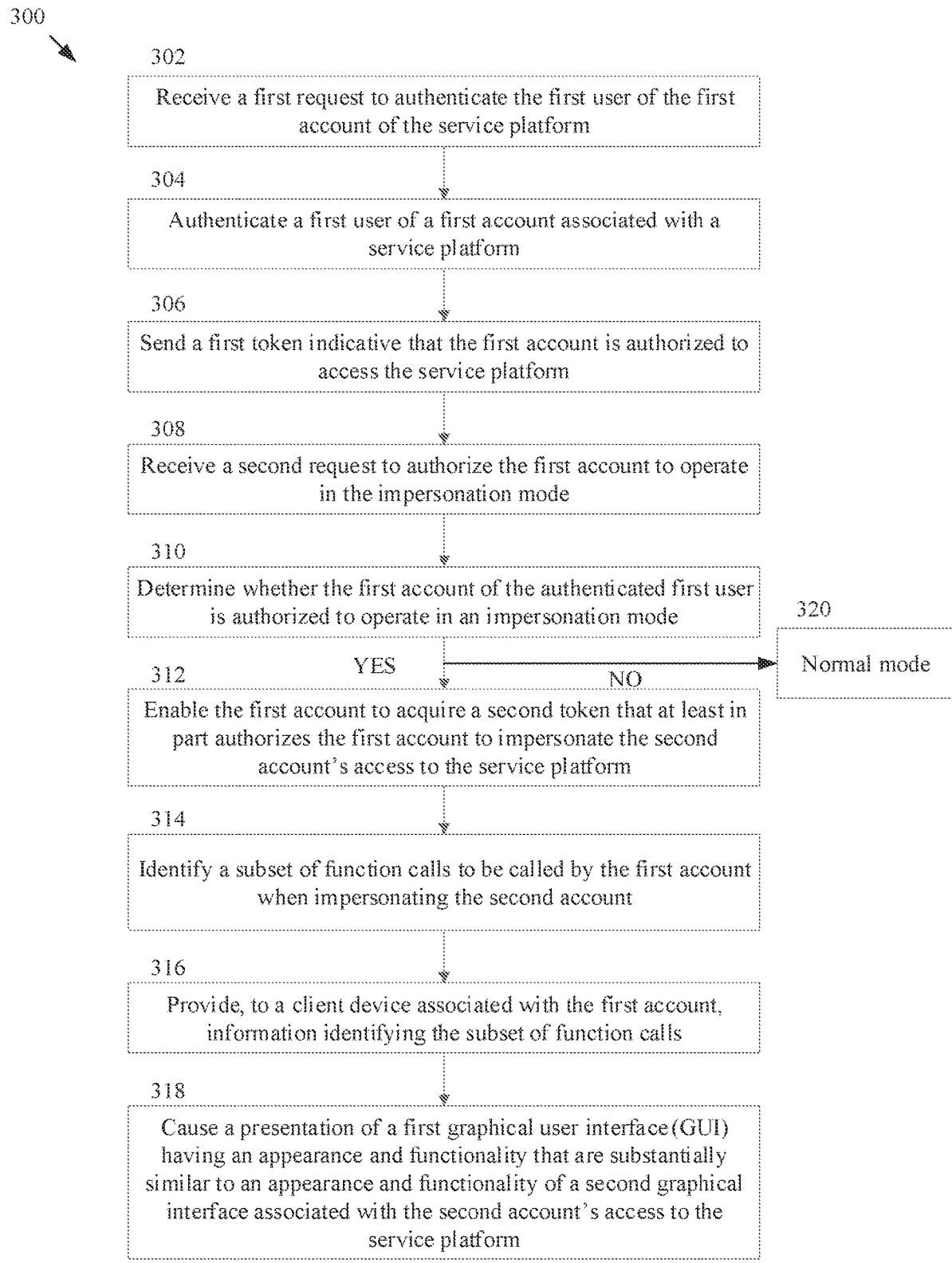
FIG. 3 depicts a flow diagram of an example method of enabling the operation of impersonation mode, in accordance with some embodiments of the disclosure.

FIG. 3 depicts a flow diagram of an example method 300 of enabling the operation of impersonation mode, in accordance with some embodiments of the disclosure.

At operation 302, processing logic receives a first request to authenticate the first user of the first account of the service platform. In some embodiments, the first request identifies one or more user credentials.

At operation 304, processing logic authenticates a first user of a first account associated with a service platform based on one or more user credentials.

At operation 306, processing logic sends a first token (e.g., access token) indicative that the first account is authorized to access the service platform. In some embodiments, operation 306 is performed responsive to authenticating the first user based on the one or more user credentials.

At operation 308, processing logic receives a second request to authorize the first account to operate in the impersonation mode. Operating in impersonation mode enables the first account to impersonate the second account's access to the service platform. In some embodiments, the request specifically requests that the first account operate in impersonation mode with respect to the second account.

At operation 310, processing logic determines whether the first account of the authenticated first user is authorized to operate in an impersonation mode. To operate in impersonation mode enables the first account to impersonate a second account's access to the service platform. If processing logic determines that the first account of the authenticated first user in authorized to operate in the impersonation mode, processing logic proceeds to operation 312. If processing logic determines that the first account of the authenticated first user in not authorized to operate in the impersonation mode, processing logic proceeds to operation 320 and continues to operate in normal mode as described above with respect to FIG. 2.

In some embodiments, to determine whether the first account is authorized to operate in the impersonation mode, processing logic determines one or more of the following. In some embodiments, to determine whether the first account is authorized to operate in the impersonation mode, processing logic determines that (or initially whether) the first account is authorized to operate in the impersonation mode. In some embodiments, to determine whether the first account is authorized to operate in the impersonation mode, processing logic determines that (or initially whether) the first account associated with a first organization of the service platform is authorized to operate in the impersonation mode for a second organization of the service platform. The second account is associated with the second organization. In some embodiments, to determine whether the first account is authorized to operate in the impersonation mode, processing logic determines that (or initially whether) the first account is authorized to operate in the impersonation mode for the second account associated with the second organization.

In some embodiments, to determine whether the first account is authorized to operate in the impersonation mode, processing logic determines components that are available to the second account of the service platform. In some embodiments, processing logic identifies, among the multiple components available to the second account of the service platform, a subset of the multiple components that are authorized for use by the first account when impersonating the second account. In some embodiments, the subset of components accessed by the subset of function calls.

At operation 312, processing logic enables the first account to acquire a second token that at least in part authorizes the first account to impersonate the second account's access to the service platform. In some embodiments, operation 312 is performed responsive to authorizing the first account to operate in the impersonation mode.

At operation 314, processing logic identifies, among a plurality of function calls that are permitted to be called by the second account, a subset of function calls to be called by the first account when impersonating the second account. In some embodiments, operation 314 is performed subsequent to authorizing the first account to operate in the impersonation mode. In some embodiments, the multiple function calls that are permitted to be called by the second account include multiple application programming interface (API) calls. The subset of function calls include a subset of the multiple API calls.

At operation 316, processing logic provides information identifying the subset of function calls to be called by the first account when impersonating the second account. In some embodiments, processing logic provides the information identifying the subset of function calls to the client device associated with the first account.

At operation 318, processing logic causes a presentation of a first graphical user interface (GUI) having an appearance (e.g., GUI elements and content) and functionality that are substantially similar to an appearance and functionality of a second graphical user interface associated with the second account's access to the service platform based at least in part on the subset of function calls (e.g., to access the functionality which can cause the presentation of content). For example, the subset of function calls can be called by the first user account to enable functionality of the service platform 120 (e.g. component of the service platform 120) that mimics the functionality provided to the second account at the service platform 120.

Figure 4:
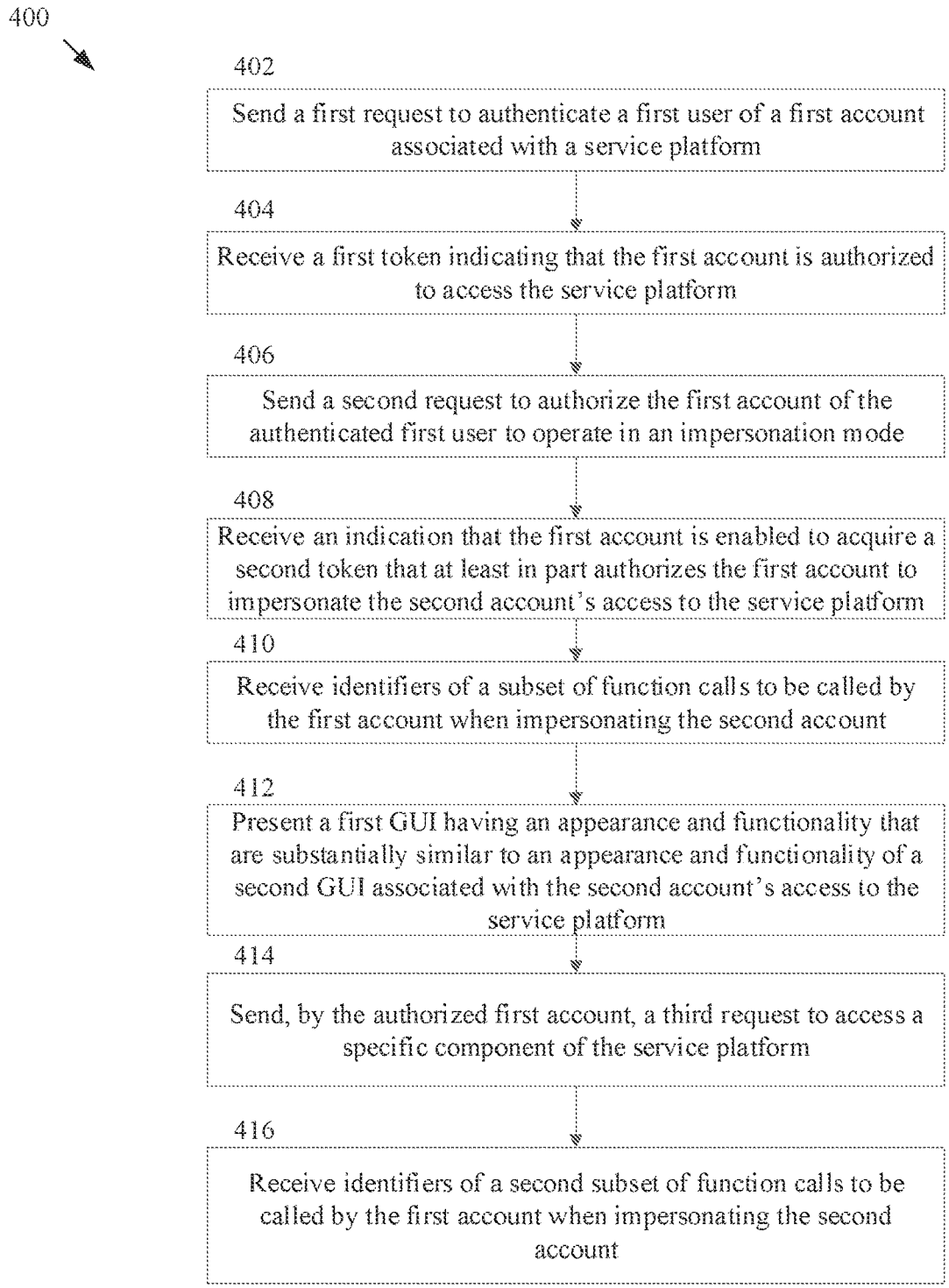
FIG. 4 depicts a flow diagram of an example method of operating in impersonation mode, in accordance with some embodiments of the disclosure.

In some embodiments, as the first account continues to access the service platform 120 in impersonation mode, processing logic can receive additional requests to access different components of the service platform 120. In some embodiments, the subset of function calls is a first subset of function calls. Processing logic receives, from the first account authorized to operate in the impersonation mode, a third request to access a specific component of the service platform. Processing logic identifies, among the multiple function calls that are permitted to be called by the second account, a second subset of function calls to be called by the first account to access the specific component of the service platform. It can be noted the multiple function calls can be all the function calls available to the second account in access the service platform or can be the function calls available to the second account with respect to the specific component. In some embodiments, the third request to access the specific component of the service platform identifies a second token that at least in part authorizes the first account to impersonate the second account's access to the service platform FIG. 4 depicts a flow diagram of an example method 400 of operating in impersonation mode, in accordance with some embodiments of the disclosure.

At operation 402, processing logic sends a first request to authenticate a first user of a first account associated with a service platform. The first request is based on one or more credentials.

At operation 404, processing logic receives a first token indicating that the first account is authorized (and the user of the first account is authenticated) to access the service platform. In some embodiments, at operation 404 the first token is received in response to the first request to authenticate the first user of the first account associated with the service platform.

At operation 406, processing logic sends a second request to authorize the first account of the authenticated first user to operate in an impersonation mode. Operating in impersonation mode enables the first account to impersonate a second account's access to the service platform. In some embodiments, the second request identifies the first token.

At operation 408, processing logic receives an indication that the first account is enabled to acquire a second token that (at least in part) authorizes the first account to impersonate the second account's access to the service platform. Processing logic receives the indication in response to the second request to authorize the first account to operate in the impersonation mode.

In some embodiments, the second token is received by the client device in a response to the second request to authorize the first account to operate in the impersonation mode. In some embodiments, processing logic retrieves the second token from memory of the client device responsive to receiving the indication that the first account is enabled to acquire the second token. In some embodiments, second token is persistently stored at the client device (e.g. in non-volatile memory or non-volatile storage, for example).

At operation 410, processing logic receives, by the first account that is authorized to operate in the impersonation mode, identifiers of a subset of function calls to be called by the first account when impersonating the second account. The subset of function calls are a subset of a multiple function calls that are permitted to be called by the second account. In some embodiments, the multiple function calls that are permitted to be called by the second account include multiple application programming interface (API) calls. The subset of function calls comprise a subset of the multiple API calls. It can be noted the multiple function calls can be all the function calls available to the second account or can be the function calls available to the second account with respect to the specific component being currently accessed by the first account.

In some embodiments, multiple components of the service platform are available to the second account when accessing the service platform. The subset of the multiple components are available to the first account when impersonating the second account based on an impersonation authorization policy. The subset of components can be accessed (e.g. functionality can be accessed) at least in part by the subset of function calls.

At operation 412, processing logic presents a first graphical user interface having an appearance and functionality that are substantially similar to an appearance and functionality of a second graphical user interface associated with the second account's access to the service platform based at least in part on the subset of function calls.

At operation 414, processing logic sends a third request to access a specific component of the service platform. In some embodiments, the third request to access the specific component of the service platform identifies the second token that at least in part authorizes the first account to impersonate the second account's access to the service platform.

At operation 416, processing logic receives identifiers of a second subset of function calls to be called by the first account when impersonating the second account. The second subset of function calls are to be called by the first account to access the specific component of the service platform when impersonating the second account. In some embodiments, the second subset of function calls are different than the first subset of function calls.

Figure 5:
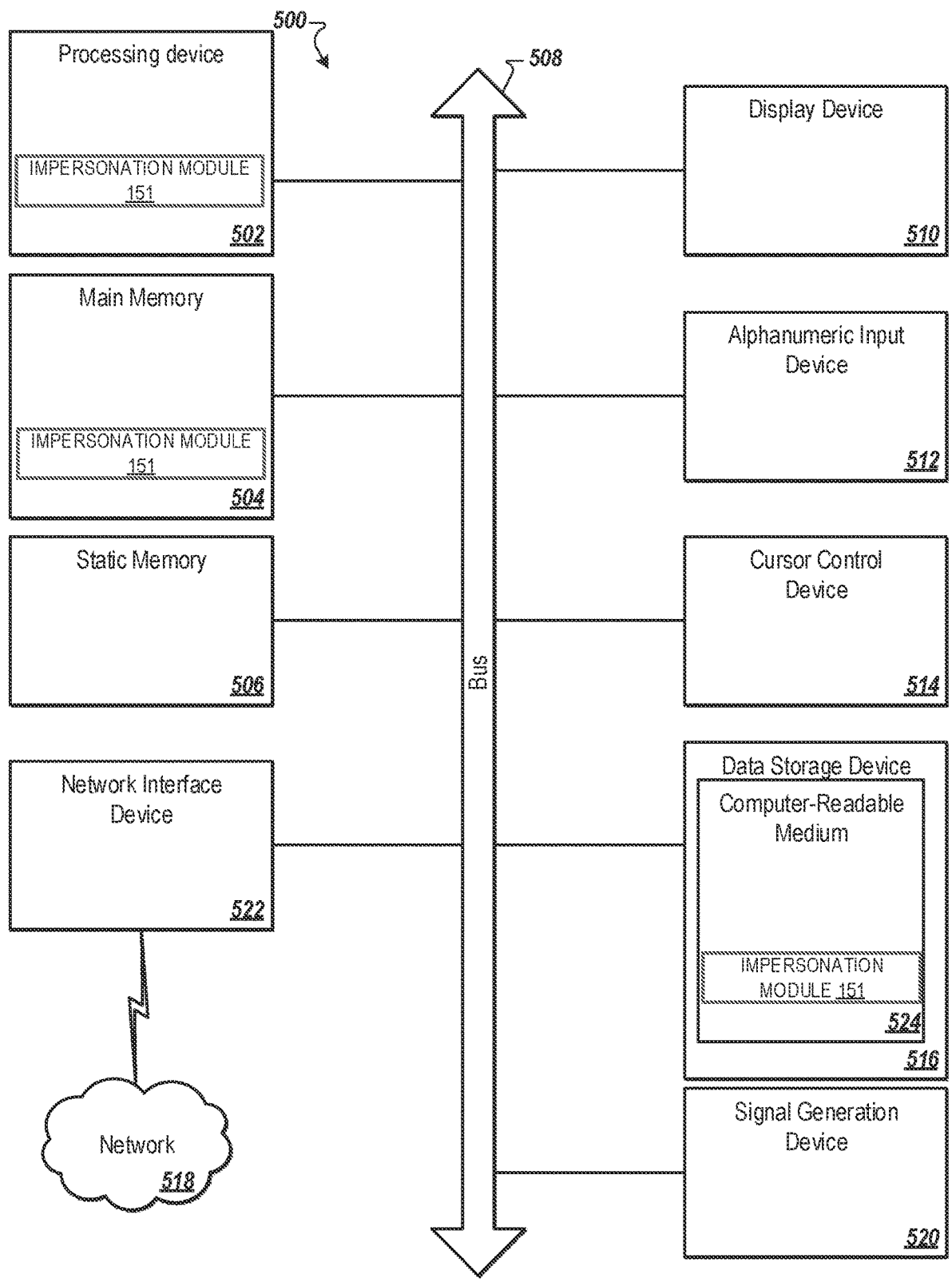
FIG. 5 is a block diagram illustrating an exemplary computer system, in accordance with some embodiments of the disclosure.

FIG. 5 is a block diagram illustrating an exemplary computer system 500, in accordance with an embodiment of the disclosure. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of impersonation module 151. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and impersonation module 151 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 of impersonation module 151 embodying any one or more of the methodologies or functions described herein. The sets of instructions of the system architecture 100 and of impersonation module 151 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
authenticating a first user of a first account associated with a service platform based on one or more credentials;
determining whether the first account of the authenticated first user is authorized to operate in an impersonation mode that enables the first account to impersonate a second account's access to the service platform;
subsequent to authorizing the first account to operate in the impersonation mode, identifying, among a plurality of application programming interface (API) calls that are permitted to be called by the second account and representing features that are available to the second account responsive to accessing the service platform, a subset of API calls permitted to be called by the first account when impersonating the second account in the impersonation mode;
providing, to a client device associated with the first account, information identifying the subset API calls to be called by the first account when impersonating the second account; and
causing, at the client device associated with the first account of the first user, a presentation of a first graphical user interface (GUI) having an appearance that reflects an appearance of a second graphical user interface that is associated with the second account of a second user and with the second account's access to the service platform.

2. The method of claim 1, further comprising:
receiving, from the client device, a first request to authenticate the first user of the first account of the service platform, the first request identifying the one or more credentials; and
responsive to authenticating the first user based on the one or more credentials, sending a first token indicative that the first account is authorized to access the service platform.

3. The method of claim 1, further comprising:
receiving a second request to authorize the first account to operate in the impersonation mode that enables the first account to impersonate the second account's access to the service platform; and
responsive to authorizing the first account to operate in the impersonation mode, enabling the first account to acquire a second token that at least in part authorizes the first account to impersonate the second account's access to the service platform.

4. The method of claim 3, wherein determining whether the first account is authorized to operate in the impersonation mode comprises:
determining that the first account is authorized to operate in the impersonation mode;
determining that the first account associated with a first organization of the service platform is authorized to operate in the impersonation mode for a second organization of the service platform, the second account associated with the second organization; and
determining that the first account is authorized to operate in the impersonation mode for the second account associated with the second organization.

5. The method of claim 3, wherein identifying the subset of API calls permitted to be called by the first account when impersonating the second account in the impersonation mode comprises:
determining a plurality of features that are available to the second account on the service platform, the plurality of features accessed by the plurality of API calls; and
identifying, among the plurality of features available to the second account on the service platform, a subset of the plurality of components features that are authorized for use by the first account when impersonating the second account, wherein the subset of features are accessed by the subset of API calls.

6. The method of claim 1, wherein the subset of function calls is a first subset of function calls, the method further comprising:
receiving, from the first account impersonating the second account in the impersonation mode, a third request to access a different part of the first GUI associated with a subset of features that are available to the second account accessing the service platform;
responsive to receiving the third request to access the different part of the first GUI, identifying, at runtime, a second subset of API calls that correspond to the subset of features associated with the different part of the first GUI and that are permitted to be called by the first account when impersonating the second account in the impersonation mode; and
providing, to the client device associated with the first account, information identifying the second subset of API calls.

7. The method of claim 6, wherein the third request to access the different part of the first GUI identifies a second token that at least in part authorizes the first account to impersonate the second account's access to the service platform.

8. The method of claim 1, further comprising:
causing the presentation of the first GUI having functionality that is substantially similar to functionality of the second graphical user interface associated with the second account's access to the service platform based at least in part on the subset of API calls.

9. A method comprising:
sending, by a client device, a first request to authenticate a first user of a first account associated with a service platform based on one or more credentials;
sending a second request to authorize the first account of the authenticated first user to operate in an impersonation mode that enables the first account to impersonate a second account's access to the service platform;
receiving, by the client device associated with the first account that is authorized to operate in the impersonation mode, identifiers of a subset of application programming interface (API) calls permitted to be called by the first account when impersonating the second account in the impersonation mode, wherein the subset of API calls are a subset of a plurality of API calls that are permitted to be called by the second account and that represent features that are available to the second account responsive to accessing the service platform; and
presenting, by the client device associated with the first account of the first user, a first graphical user interface (GUI) having an appearance that reflects an appearance a second graphical user interface that is associated with the second account of a second user and with the second account's access to the service platform.

10. The method of claim 9, further comprising presenting, by the client device associated with the first account, the first graphical user interface having functionality that is substantially similar to functionality of the second graphical user interface associated with the second account's access to the service platform based at least in part on the subset of API calls.

11. The method of claim 9, further comprising:
receiving a first token indicating that the first account is authorized to access the service platform in response to the first request to authenticate the first user of the first account associated with the service platform; and
receiving an indication that the first account is enabled to acquire a second token that at least in part authorizes the first account to impersonate the second account's access to the service platform in response to the second request to authorize the first account to operate in the impersonation mode.

12. The method of claim 11, wherein the second token is received by the client device in a response to the second request to authorize the first account to operate in the impersonation mode.

13. The method of claim 11, further comprising:
responsive to receiving the indication that the first account is enabled to acquire the second token, retrieving the second token from memory of the client device, wherein the second token is persistently stored at the client device.

14. The method of claim 9, wherein a plurality of features of the service platform are available to the second account when accessing the service platform, and wherein a subset of the plurality of features are available to the first account when impersonating the second account based on an authorization policy, wherein the subset of features are accessed by the subset of API calls.

15. The method of claim 9, wherein the subset of function calls are a first subset of function calls, the method further comprising:
sending, by the first account impersonating the second account, a third request to access a different part of the first GUI associated with a subset of features that are available to the second account accessing the service platform; and
responsive to sending the third request to access the different part of the first GUI, receiving, by the client device at runtime, identifiers of a second subset of API calls that correspond to the subset of features associated with the different part of the first GUI and that are permitted to be called by the first account when impersonating the second account in the impersonation mode.

16. The method of claim 15, wherein the third request to access the different part of the first GUI identifies a second token that at least in part authorizes the first account to impersonate the second account's access to the service platform.

17. A non-transitory computer-readable medium comprising instruction that, responsive to execution by a processing device, cause the processing device to perform operations comprising:
sending a first request to authenticate a first user of a first account associated with a service platform based on one or more credentials;
sending a second request to authorize the first account of the authenticated first user to operate in an impersonation mode that enables the first account to impersonate a second account's access to the service platform;
receiving, by the first account that is authorized to operate in the impersonation mode, identifiers of a subset of application programming interface (API) calls permitted to be called by the first account when impersonating the second account in the impersonation mode, wherein the subset of API calls are a subset of a plurality of API calls that are permitted to be called by the second account and that represent features that are available to the second account responsive to accessing the service platform; and
presenting, by a client device associated with the first account of the first user, a first graphical user interface (GUI) having an appearance that reflects an appearance a second graphical user interface that is associated with the second account of a second user and with the second account's access to the service platform.

18. The non-transitory computer-readable medium of claim 17, the operations further comprising:
presenting, base at least in part on the subset of API calls, the first graphical user interface having functionality that is substantially similar to functionality of the second graphical user interface associated with the second account's access to the service platform.

* * * * *